STYLUS AND EQUIPMENT TESTING RECORD FOR RECORD PLAYERS

Filed Dec. 23, 1965

Inventor

K. G. CALDWELL

By

Holcombe, Wetherill + Brisebois

Attorneys

United States Patent Office
3,460,841
Patented Aug. 12, 1969

3,460,841
STYLUS AND EQUIPMENT TESTING RECORD FOR RECORD PLAYERS

Keith G. Caldwell, 8 Innes Road, Greenwich, New South Wales, Australia

Filed Dec. 23, 1965, Ser. No. 516,063
Claims priority, application Australia, Dec. 30, 1964, 53,477/64; Mar. 2, 1965, 55,822/65
Int. Cl. G11b *3/80, 3/68*
U.S. Cl. 274—42 12 Claims

ABSTRACT OF THE DISCLOSURE

A record disc for detecting defects in record playing equipment, the disc having a playing groove which exhibits, when used with defective equipment, an interruption to the regular reflected light pattern or produces a new pattern of light reflection.

The invention is for domestic and commercial use in connection with record playing or reproducing equipment and relates to the selection and mechanical arrangement of wave forms of a groove on a disc record, in order that they show visibly whether the actual equipment in use is causing damage to ordinary recorded music discs, and by evaluation to show the cause of the damage this in turn enables the user to prevent damage to the records of his collection. In effect it is a disc carrying a modulated groove arranged so that the inner or outer walls of the groove form a mirror-like light reflecting surface and when damaged by playing, the variation in the light reflection is plainly discernible and is in most cases, discernible without the use of optical aids.

Audible or electronic tests may be associated with the visual test.

Until now there has been no way by which a record collector could tell whether his records were being damaged or not, for instance to some extent a microscope enables inspection of the stylus point for wear but this in itself does not ensure "nil" damage as a result of its use, because apart from the knowledge required to make a proper inspection, lack of polish and sharp facets on the tip of a stylus which would not normally be visible under a needle examining microscope, can ruin a record with just one playing. Again if the perfect stylus point is incorrectly mounted or inserted with side loading, a fairly common fault, then again records played will be ruined and in the same way if the compliance is not good or a stiffness has developed in the system, serious damage will occur to records played.

This invention provides the record owner with a positive and reliable means of regular testing to protect his investment in records at a reasonable cost.

The present invention provides a disc record for testing a record-playing pick-up cartridge and or stylus, in order to determine whether or not it will damage the grooves of recorded discs, in which at least one portion of the disc is formed with a spiral groove, or a series of circular grooves, each loop of which is formed with two or more different wave forms, which are arranged to produce a visible regular pattern of light reflection whereby engagement with the stylus when the stylus is worn, or causing damage to the disc due to faults of the stylus or its insertion in the cartridge or, when the cartridge itself does not permit the stylus to trace the modulation of the groove correctly due to stiffness or lack of compliance, the resultant damage will cause an interruption to the regular pattern of light reflection or produce a new pattern of light reflection.

The system of sectorial recording enables, by holding in sectors identical wave forms, any desired number of tests to each revolution and provides a more even pattern of reflected light than that obtained with random recording.

The term "in phase" recording used herein means that the same wave formation is reproduced on any convolution between any two radial lines. Thus each "groove" appears parallel with the adjoining one and in fact enables the disc to be cut with more lines or "grooves" to the inch than is possible with a normal disc because no space for modulation is required between the "grooves" (the space is generally referred to as the "land"), irrespective of the amplitude of the modulation.

"In phase" recording even when using normal groove and land arrangement more than doubles the mirror reflectance effect of the walls and when the land is almost eliminated the correct point source light will reflect light from the same points of the wave to the eye of the observer and thus any interference with reflectance will be most noticeable.

"In phase" recording allows appropriate grooving to be cut at a greater number of grooves per inch, i.e., g.p.i., for instance, for use with playing equipment employing a stylus of .0007" tip radius at approximately 525 g.p.i. instead of an average of 220 g.p.i. and a rarely used maximum of 330/350 g.p.i. in normal records. The effect of this is of the utmost importance because repetitive damage to a concentration of six grooves will be observed by the eye as a thin line of light difference or scratched surface, for the total width of damaged area is only .011", whereas with normal recording system not only does the "land" between the grooves break up the "mirror surface" of the groove walls but the area of damage is more than double and, as in any case the width of damage to the walls may be less than one-tenth of the width of the wall itself the damage is not so easily discernible.

By combining "in phase" and sectorial recording any number of tests desired may be included in one loop and a much more sensitive test is obtained than would otherwise be possible.

For stylus testing simple sine waves or compound waves may be used. In principle the larger the "flats" worn on a stylus the lower down the frequency range will the damage appear, i.e., a worn stylus damages all frequencies from the highest inscribed on the disc to the lower limit which is related to the size of its "flat," thus frequencies can be chosen to indicate the extent of wear.

Sensitivity may be upgraded by loading the chosen frequency with a low frequency wave by adding the two frequencies together in suitable proportions.

In use the purchaser will first examine the disc under appropriate light conditions, and after placing on the turntable lower the pick-up in an unused portion to play for about six rotations watching to see the effect of the needle on the surface as it rotates and if necessary making a further inspection under the appropriate point source light condition after removal.

Assuming that the stylus has been correctly inserted in a cartridge of good compliance then a perfect needle should cause no damage on the disc unless it includes an identifying sector wherein the modulation is deliberately arranged so that damage would occur in order to establish the precise radius of playing and enable by measurement closer inspection of other parts of the disc.

Examination for damage will be facilitated if the disc is issued with a test, "damage/accept," or similar fault indicator impressed suitably, as it will show approximately the inspection angle to be used.

In some cases the use of a magnifying glass may be of assistance in the examination but the naked eye of a normally sighted person will usually observe the damage.

The observer will see light reflection from the outer wall of the groove above the label on the disc and nearer to him below the label the inner groove wall, thus he can more easily trace the cause of damage.

The disc can be marked for acceptance or rejection of equipment according to sectors damaged. Once the satisfactory performance of a cartridge is established with this disc the appearance of damage subsequently usually indicates needle wear.

The condition of faulty cartridge—mounting—or needle is established by elimination.

As far as audible or electronic testing is concerned, wave forms of the main test surface or a separate test surface can be arranged in several sectors so that each convolution tests one or more high frequency sound against the intervening medium frequency reference sound in a repetitive manner. Thus when flats are worn on a stylus it will be unable to trace the high frequency wave form and loss of sound will give a clear warning of reproduction faults. On some equipment comparative checks will be necessary.

The invention is described with reference to the accompanying drawings in which.

Figures 1, 2, 3, 4, 5:
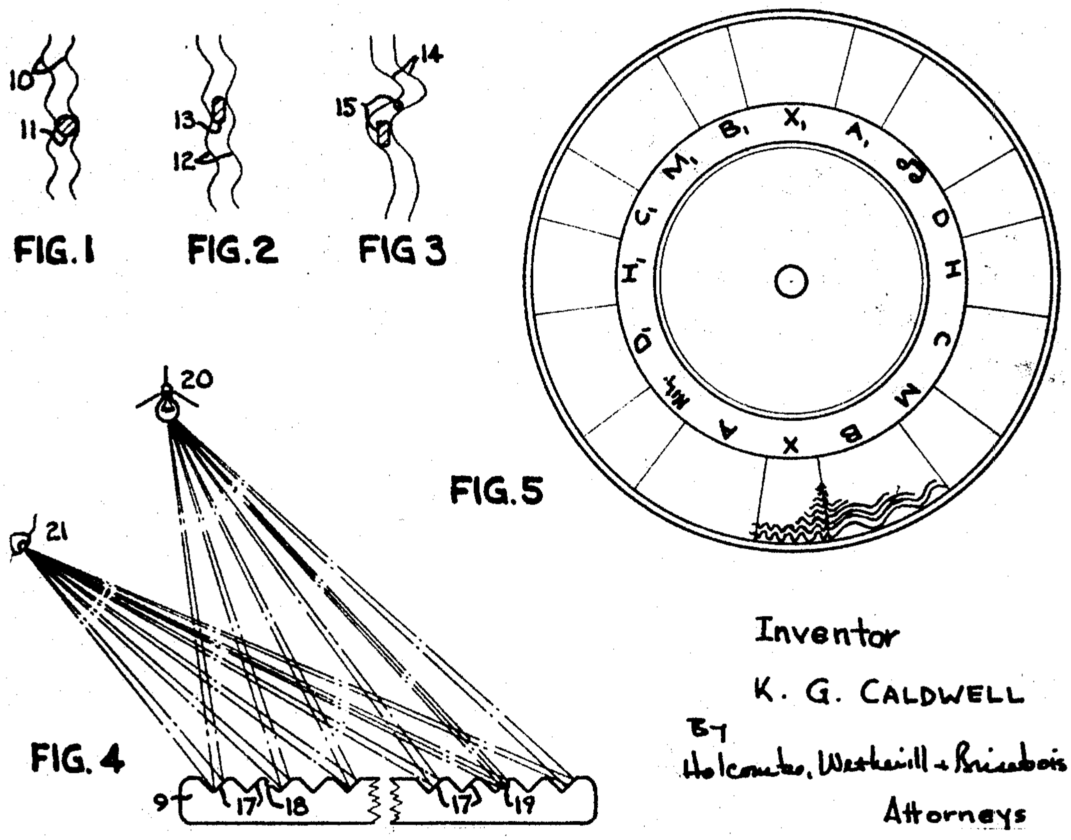
FIGURES 1, 2 and 3 are magnified drawings of part of a modulated record groove.
FIGURE 4 illustrates a method of examination of a record for evaluation purposes.
FIGURE 5 is a plan view of a record illustrating the arrangement of one type of test pattern.

FIGURES 1, 2 and 3 are magnified plan views of a modulated record groove whilst the numbers 11, 13 and 15 show that the almost hemispherical point of the new stylus traces the full modulation of the groove, irrespective of "pinch effect" 14, whereas a worn stylus having flats on its sides rides lower in the groove and is thus of such shape and dimension that it tends to bridge the high frequency wave forms and this results in groove damage, distortion, and restricted amplitude of output.

FIGURE 4 shows diagrammatically, portion of a magnified diametrical section through a record 9, and the effect of reflection from a point source light 20 to the observers eye 21 from normal grooves 17 and damaged grooves 19, in the record of the invention. It will be noted that 18 is the same surface as 19.

FIGURE 5 is a plan view of a disc record of the invention and is one of the arrangements used successfully in development. It will be observed that sectors were arranged with similar wave form characteristics, which for convenience are only partially drawn out, in opposite sectors with minor exceptions and that it was divided unequally to provide the largest possible sector for examination with a given number of sectors, without losing the advantage of examination of the inner or outer walls of the groove almost simultaneously and that a pattern of low frequency inspection is available alongside each of the more subject to damage, higher frequencies. On that particular development test disc, frequencies used were as follows:

| Sectors | 33⅓ r.p.m. for testing .001″ tip radius (cycles) | 45 r.p.m. for testing .0007″ tips (cycles) |
|---|---|---|
| X X1 | 8,000 | 10,800 |
| A A1 | 150 | 202.5 |
| B B1 | 275 | 371.25 |
| C C1 | 650 | 877.5 |
| D D1 | 960 | 1,296 |
| M M1 | 2,500 | 3,375 |
| H H1 | 5,000 | 6,750 |
| Music | Music | Music X |
| Nil | Unmodulated | Unmodulated |

In phase wave form is shown diagrammatically in sectors X and B.

Figure 6:
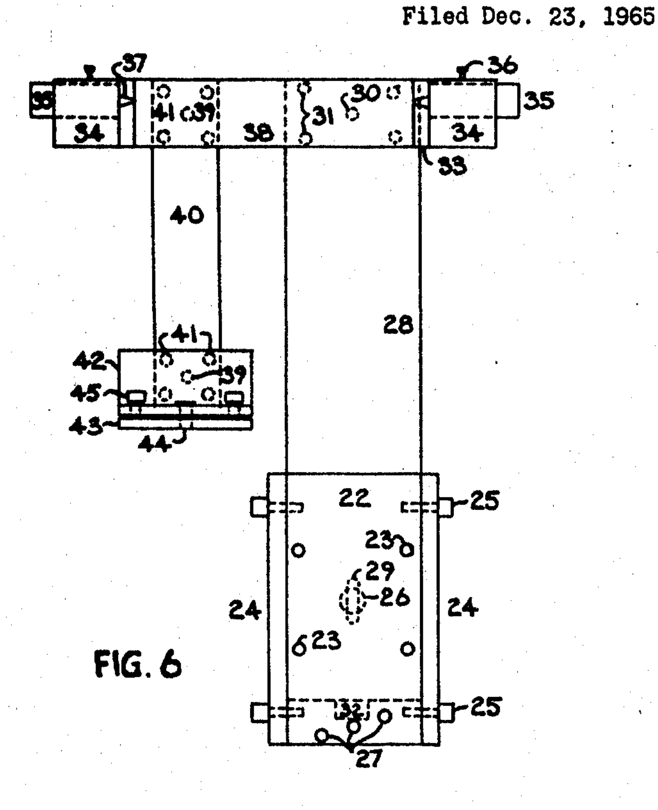
FIGURES 6 and 7 show side and end elevations of a mounting for the recording head for carrying out the recording technique of this invention.
Figure 7:
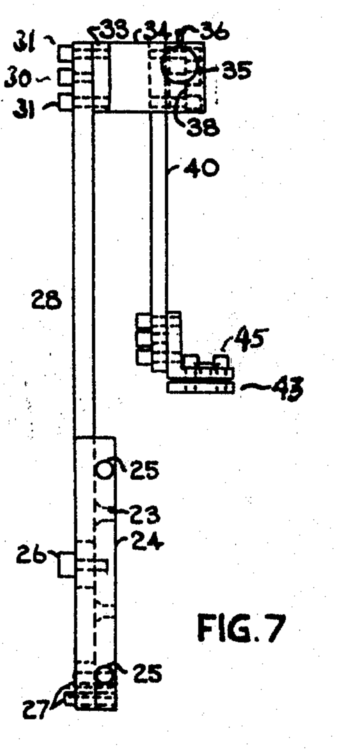

FIGURE 6 shows the elevation view of head carrying bracket for "in phase" recording from the turntable side and FIGURE 7 the end elevation. With the exception of the steel sliding pivot pins with hardened points, the high tensile steel cap screws and C/S head screws, the unit is all made from brass bar or angle. The vertical plate 22 is fixed to the vertical face of the turntable lathe bed plate by means of countersunk head screws at positions 23. The bed plate has cheeks or guides 24 held by bolts 25 to guide the height adjustable vertical sliding stanchion 28. The clamp screw 26 operating in slot 29 of the stanchion, ensures rigidity of the stanchion in any setting whilst the removeable pegs 27 enable a rapid correct change of height of recording head for "track" change and block 32 can be used as a spacer for precise height setting. A substantial, fixed cross bar 33 is held at the appropriate attitude, angle, and distance from the stanchion 28 by the setting of four cap screws 31 in the stanchion 28 and the clamping action of the centre bolt 30 which passes through an oversize hole in the stanchion and screws into the cross bar itself. A pair of brass blocks 34, bored for the pivot pins 35 are rigidly mounted to each end of the cross bar 33 and the pivot points 37 are fixed with set screws 36 to remain in engagement, in any set position, with the main pivoted cross arm 38. This pivoted cross arm carries the "swinging arm" 40 for the head bracket 42, both being attached in a similar manner to that already described for the fixed cross arm with set screws 41 and clamp screws 39. The mounting plate 43 for the underslung head is held similarly by screw 44 against the four adjustable cap screws, 45. The swinging arm must be of sufficient length to not effect the good contact of the tape on the turntable due to angular change with imperfections of the periphery and, of sufficient mass to provide stability and, the whole must be rigid. The sliding pivots allow substantial horizontal movement for various head setting arrangements, in order to contact the periphery correctly, as well as very fine adjustment.

Actual production of the test disc is the same as for recorded music and no particular description is necessary because the principles are well known. However the cutting of the lacquer master for processing presents problems and difficulties. Variations in design of recording lathes limit the explanation to a guide to the best approach to achieve the final result desired but are based on the method described hereafter.

For sectional recording, contacts on the turntable itself were connected to a switching device (uniselector) so that signals from suitable wave generators could be accurately switched to the recording amplifier to produce the desired result. A positive switch control locked to the turntable to avoid lag or lead is essential, the switching method is not important so long as accuracy of switching is assured.

"In phase" recording requires a repetition accuracy of an extremely high order in fact a radial creep of less than .0001″ would make it impractical, a "locked on" accuracy was achieved by using a nonferrous turntable with an accurately turned and polished periphery which would run past a recording reproducing head at 15″ per second—a large diameter turntable is preferred as it makes better contact with the head.

Lubricated half inch BASF magnetphonband recording tape was wrapped around the turntable periphery. The actual recording reproduce head and the erase head were shielded and mounted to a multi-adjustable brass bracket at the end of a long free swinging spring loaded heavy arm to the turntable bed plate. The heavy arm was used as the simplest method of maintaining good tape contact by packing the wrapped recording tape referred to with two layers of similar material and the three thicknesses were sufficiently resilient to smooth out minute peripherial irregularities as a weightless, close following head is not practical. Care must be taken in the tape wrapping, particularly at the superimposed joins and some running against the head is necessary to polish the tape ready for use. A very fine adjustment of the "spring" pressure is necessary to prevent chatter. The whole setting up is tedious and exacting. The best position for the recording head is directly opposite the precise position of the cutting stylus so that faults to be removed can be accurately positioned and dealt with.

The recording and erase heads are connected to a suitable recorder or circuitry and the original signal can be recorded on the virgin tape on the turntable periphery by means of the sectorial switching already referred to, appropriately switched to act during one rotation and the method can be used to change just one sector of the recording or the signal can be transferred from a specially calculated and prepared tape suitably switched.

With the head switched to the "play" position the signal, recorded on the tape, with faults if any, suitably amplified and equalized may be fed to the recording amplifier and disc cutter head and so to the disc, with a signal always "in phase." It should be noted that the recording can only be commenced or finished by rapid scrolling as there is no land to take the modulation.

The lathe itself must be of very high quality if very fine grooving is attempted.

I claim:

1. A disc record for testing a record playing stylus for damage to the record by the stylus, in which at least one portion of the disc is provided with a plurality of loops formed by at least one groove and radially spaced about a common center, each loop being modulated with at least two different wave forms in a manner producing a definite regular visible pattern of light reflection which will be changed by damage to the test disc by the stylus, said modulation wave forms being so arranged that the resulting reflected light pattern is divided radially into sectors.

2. A disc record as claimed in claim 1 in which the complete wave formation over a predetermined length of any one loop beginning at a predetermined imaginary radial line is exactly repeated in all other loops starting at the same imaginary radial line.

3. A disc record as claimed in claim 1 in which at least one modulated wave form is arranged for electronic testing.

4. A disc record as claimed in claim 1 in which at least one modulated wave form is arranged for audio testing.

5. A disc record as claimed in claim 1, in which the wave modulations in any one loop are "in phase" with the modulations in all other loops starting on the same imaginary radial line.

6. A disc record as claimed in claim 5 having in excess of 500 grooves per inch.

7. A disc record as claimed in claim 1, in which each separate modulation (or frequency) occupies a sector of the disc.

8. A disc record as claimed in claim 1, wherein at least one modulated wave form is such that it will be damaged by any stylus.

9. A disc record as claimed in claim 1, wherein the several wave forms are in the form of gliding frequencies which all begin at the same radial line.

10. A disc record as claimed in claim 1 in which the successive turns of a single spiral groove form said plurality of loops.

11. A disc record as claimed in claim 10 in which said wave forms are arranged to divide the reflected light pattern radially into visibly distinct sectors.

12. A disc record as claimed in claim 1 in which said loops are concentric circles.

References Cited

UNITED STATES PATENTS 2,740,296 4/1956 Andres -------------- 73—432

LEONARD FORMAN, Primary Examiner

F. J. D'AMBROSIO, Assistant Examiner

U.S. Cl. X.R.

73—432